United States Patent [19]
Wen

[11] Patent Number: 5,822,660
[45] Date of Patent: Oct. 13, 1998

[54] COPYRIGHT PROTECTION IN COLOR THERMAL PRINTS

[75] Inventor: Xin Wen, Rochester, N.Y.

[73] Assignee: Eastman Kodak Company, Rochester, N.Y.

[21] Appl. No.: 598,446

[22] Filed: Feb. 8, 1996

[51] Int. Cl.[6] .......................... G03G 21/00; G03G 21/04
[52] U.S. Cl. .......................... 399/194; 380/51; 380/55; 358/450; 347/172; 399/366
[58] Field of Search .......................... 355/201; 347/172; 380/54, 55, 51; 358/450; 399/182, 194, 366

[56] References Cited

U.S. PATENT DOCUMENTS

| 5,018,767 | 5/1991 | Wicker | 283/67 |
| 5,193,853 | 3/1993 | Wicker | 283/85 |
| 5,231,663 | 7/1993 | Earl et al. | 380/18 |
| 5,257,119 | 10/1993 | Funada et al. | 358/438 |
| 5,286,286 | 2/1994 | Winnik et al. | 106/21 |
| 5,291,243 | 3/1994 | Heckman et al. | 355/201 |
| 5,375,886 | 12/1994 | Tsuchiya | 283/93 |
| 5,379,093 | 1/1995 | Hashimoto et al. | 355/201 |
| 5,385,803 | 1/1995 | Duff et al. | 430/138 |
| 5,390,003 | 2/1995 | Yamaguchi et al. | 355/201 |
| 5,396,559 | 3/1995 | McGrew | 380/54 |
| 5,412,718 | 5/1995 | Narasimhalu et al. | 380/4 |
| 5,418,602 | 5/1995 | Nishikawa | 355/201 |
| 5,430,525 | 7/1995 | Ohta et al. | 355/201 |
| 5,444,779 | 8/1995 | Daniele | 380/3 |
| 5,465,161 | 11/1995 | Funada et al. | 358/450 |
| 5,530,759 | 6/1996 | Braudaway et al. | 380/54 |
| 5,541,741 | 7/1996 | Suzuki | 358/450 |
| 5,557,412 | 9/1996 | Saito et al. | 355/201 X |

OTHER PUBLICATIONS

E.N. Willmer and W.D. Wright, "Nature," Jul. 28, 1945, p. 119, vol. 156.
Research Disclosure No. 365, Sep. 1994.
"In Photoshop" Phillip Fortune, Dec. 14, 1995, University of CT Health Centerr, Internet article.

Primary Examiner—R. L. Moses
Attorney, Agent, or Firm—Edward Dugas

[57] ABSTRACT

Disclosed is a copy protection method for identifying copied images that have been captured or generated in electronic form. The method generates information in electronic form for causing the printing of copy restrictive information as a plurality of contiguous pixels, of substantially yellow color onto the hard copy. The visibility of the yellow pixels is very low until a cyan illumination is applied to the protected image then the copy restrictive information becomes highly visible.

10 Claims, 4 Drawing Sheets

COPYRIGHT PROTECTION IN COLOR THERMAL PRINTS

CROSS-REFERENCE TO RELATED APPLICATIONS

The present application is related to U.S. application Ser. No. 60/004,404, filed Sep. 28, 1995, by Jay Schildkraut, et al., and entitled, "Copy Protection System".

FIELD OF THE INVENTION

The invention relates generally to the field of copy protection for color prints, and in particular to the protection from copying with continuous tone printers.

BACKGROUND OF THE INVENTION

As copy print systems become more widely used, copyright violations to the copyright photographs become a serious and urgent issue. These systems are capable of printing photographic quality images that are almost non-distinguishable from the original pictures. As this new technology successfully satisfies the needs of most customers, serious concerns have arisen among professional photographers about copying of their copyright images. Effective counterfeiting techniques have been demanded to be included in these products.

This invention provides an easy and low cost method to protect the copy rights of the picture owners by inscribing the copyright information of the owner and/or information about the printing event such as time, location, and the serial number of the printer so that the counterfeiter can be easily traced.

In the prior art, techniques that add additional information in the nonvisible wavelengths, for example IR, UV, and fluorescence, require extra components that are sensitive to those wavelength ranges therefore adding costs to both media and the additional detection equipment.

Other techniques require that the original media carry nonvisible patterns that produce visible information upon copying. These techniques limit the protection only to color prints made on the specific media. Furthermore the specialized media adds extra costs to the original print.

A technique of forming the text or image onto a noncontrasting color paper such that a copy machine will form a copy that is degraded or not readable is commonly used in the software industry to prevent the copying of game code data. Since most color prints have to contain wide color density ranges to illustrate color richness, the use of a noncontrasting paper with a noncontrasting text or image is not particularly useful to the field of copy print systems.

Based on the limitations of the prior art, it would be highly desirable to provide a copy protection technique that does not add additional complexity and costs to the color copying process.

SUMMARY OF THE INVENTION

The present invention is directed to overcoming one or more of the problems set forth above. Briefly summarized, according to one aspect of the present invention there is provided a copy protection method for identifying copied images, comprising the steps of:

a) capturing the image in electronic form;

b) generating copy restrictive information in electronic form for printing as a plurality of contiguous pixels of substantially yellow color;

c) merging the electronic forms of the image and copy restriction information from steps a) and b) to form a composite printable image d) printing the composite printable image using continuous-tone digital printing in which the copy restrictive information is printed as a plurality of contiguous pixels of yellow color density lower than 0.2 and at spatial frequencies not sensitive to the human visual system; and e) detecting the copy restrictive information on the printed image for identifying unauthorized copies.

ADVANTAGEOUS EFFECT OF THE INVENTION

The present invention has the following advantages:

1. Easily implemented with current color printing systems, no additional parts or cost are necessary.
2. It can be implemented without altering the content of the original print.
3. Non-obvious to viewers; but easily detectable with a simple technique.
4. Applicable to a wide range of printers such as the ones that utilize thermal dye diffusion, silver halide process, and direct thermal dye (i.e. receiver only and donorless).
5. Information may be concealed in cryptic text or artistic encoded patterns.

DETAILED DESCRIPTION OF THE INVENTION

Figure 1:
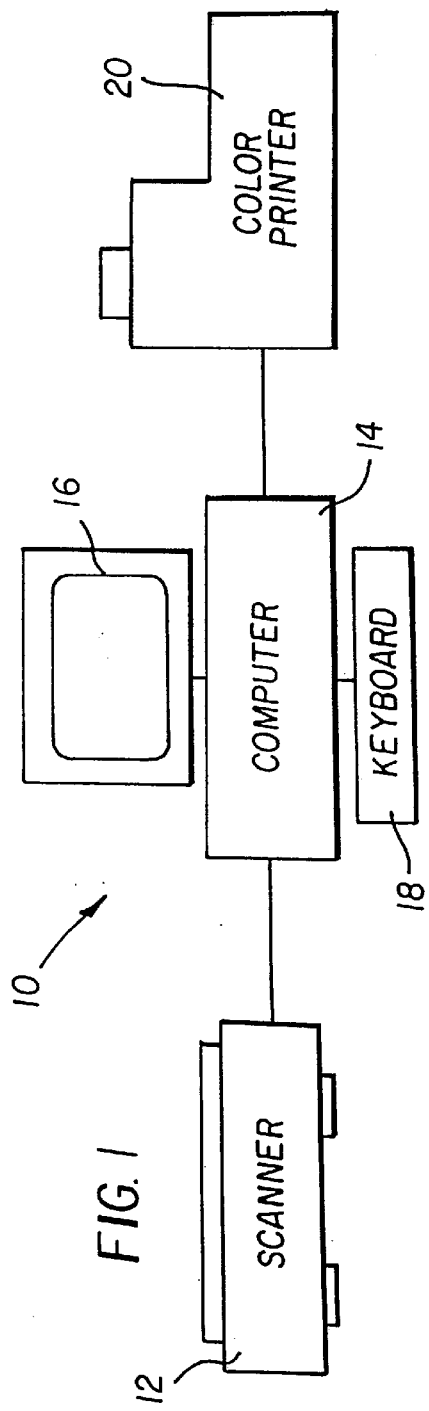
FIG. 1 is a block diagram of a color copy and print system of the type upon which the present invention is implemented.

Referring to FIG. 1, a color copy print system 10 for providing on-the-spot reprinting and enlargement of the photographic prints is comprised in general of a scanner 12 for electronically capturing the image and for providing the electronic image to a computer 14 of the type that incorporates a monitor 16 for viewing the captured image and optionally either a touch screen on the monitor face or a keyboard 18 for providing an operator with a means for interacting with the computer 14. A color printer 20 receives the processed electronic image from the computer 14 and forms the hard copy print in a number of known ways. Examples of these systems are exemplified by Kodak's Digital Copy Print Station and Fuji's Pictrography print station. Examples of the color printers are Kodak XLS8600 thermal printer, Fuji's Thermo-Autochrome and Pictrograph printers and color laser printers. In such systems, the customer brings in either a photographic print or other type of printed image and the image is scanned by the scanner 12 and then transferred and stored in the computer. An image of photographic quality is printed by, for example, a thermal dye transfer color printer at a variety of print sizes.

Figure 2:
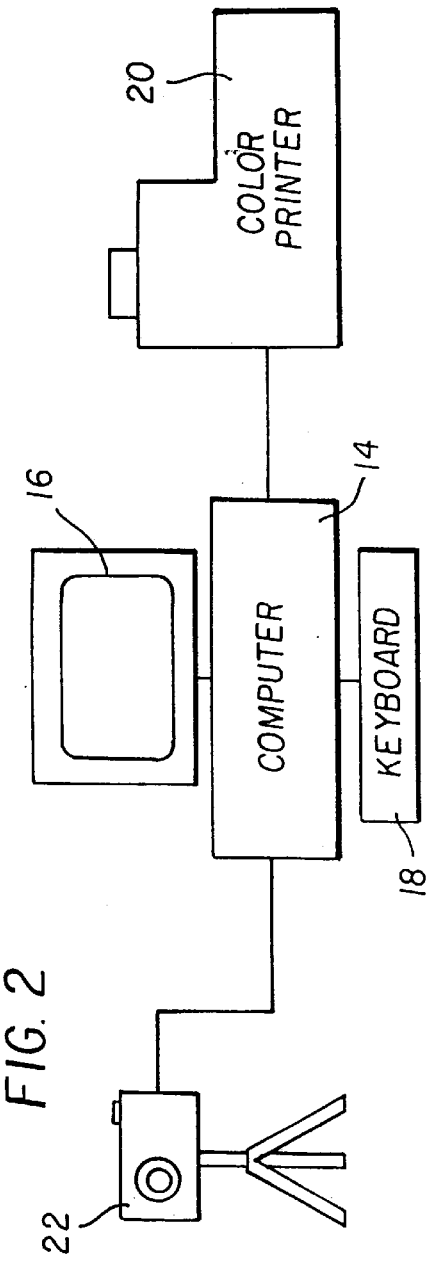
FIG. 2 is a block diagram of an image capture and print system.

The system of FIG. 2 acquires an image on site with an electronic camera 22, that may be a digital camera. The electronic image from the camera 22 is transferred to the computer 14 for processing and subsequent printing by the color printer 20. To protect his/her work from copying, the photographer has the need to add personal copy restrictive information on the print of these images so that any copy of their work can be easily detected.

This invention addresses the above need with a novel technique that detects the copying (counterfeiting) of photographic works and the like. For the copy print system of FIG. 1, this technique prints information as to the printing event (e.g. location, time, serial number of the printer) on the final print using colors available to color printers. This makes the counterfeit print traceable, and will therefore significantly deter and reduce copyright violations. For image capture and print systems, this technique can also add the photographer's personal copyright information such as signature and additionally a copyright logo onto the final print.

The technique uses the following attributes in color (thermal) printers:

1. The human eye has different sensitivities to different colors. The above mentioned copy restrictive information is printed in a yellow color that is less sensitive to the eye, and detected in a green color that is more sensitive to the eye ("Measuring Color" by R. W. G. Hunt, John Wiley & Sons, 1987).
2. Many color printers, especially continuous-tone color printers, are capable of printing a wide dynamic range of image densities. This implies that it is possible to print very low density in yellow with these printers.
3. The restrictive information (printing and/or copyright information) can be printed in plain text, cryptic form or concealed in an artistic pattern.
4. The restrictive information (printing and/or copyright information) can be printed inside (A) or outside of the image area in the margins (B), see FIG. 3. When they are printed in the margins, the image is not altered. When they are printed in the image, it is difficult to visualize the light yellow printing thereby maintaining the viewable quality of the image.

Implementation of the present invention is by way of software embedded in the computer 14 or the color printer 20. The flow charts representing the algorithms of the software used on the color copy print system and image capture print system are illustrated in FIGS. 4 and 5, respectively.

Figure 4:
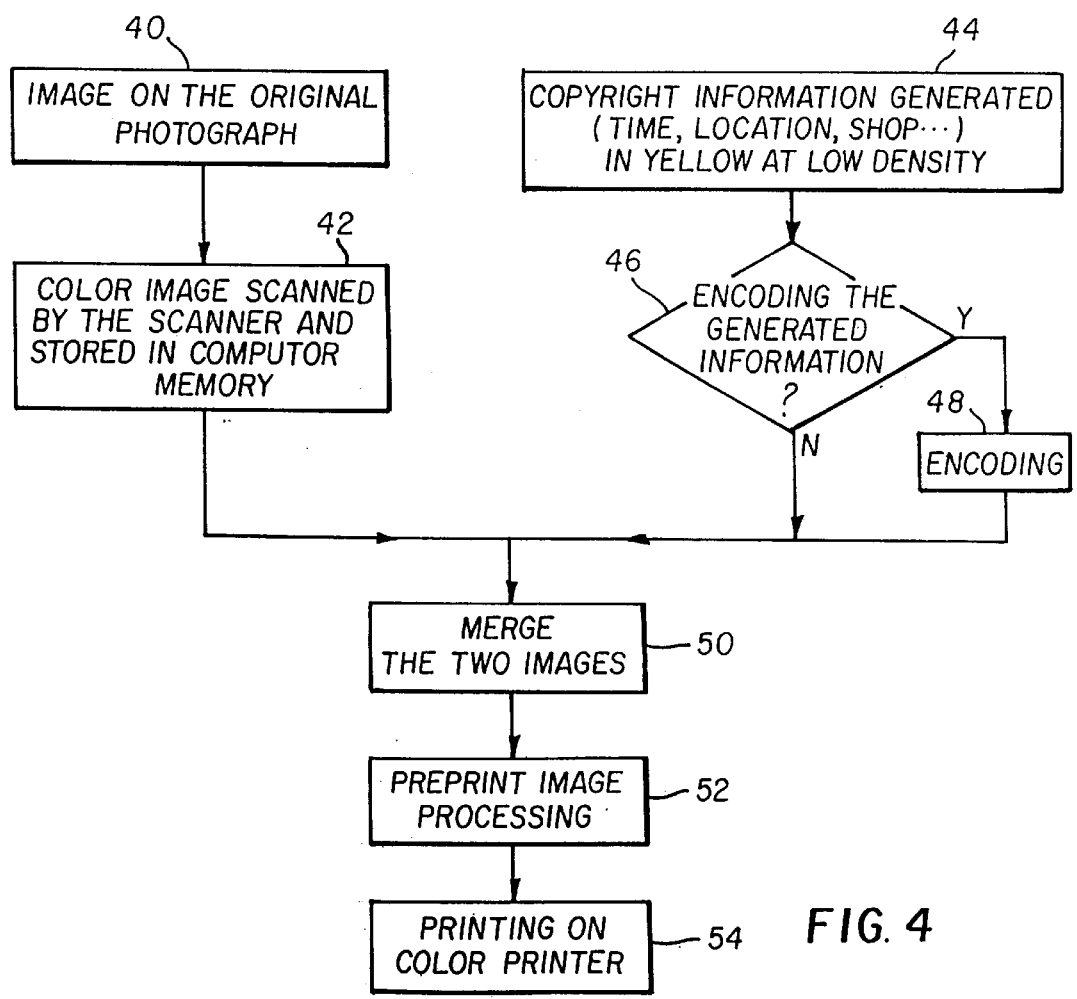
FIG. 4 is an algorithm for printing copyright information for the color copy and print system.

Referring now to the flow chart of FIG. 4, in the function of block 40, the image on an original photograph or other hard copy is acquired. In block 42 the image is scanned and the resultant electronic signals are stored and/processed. Copy restrictive information is formed in block 44 for inclusion, if desired, onto the print that will be made from the electronic signals. The copy restrictive information may be encoded or not encoded based on the decision selected by the operator and represented by the decision block 46. If encoding is selected the encoding function is activated and the copy restrictive information is encoded by the function of block 48. If the copy restrictive information is not to be encoded, it bypasses the encoding block of 48. The encoded copy restrictive information from encoding block 48 or the non-encoded copy restrictive information from block 44 is then merged with the scanned color image of block 42 in block 50. The composite image of 50 then proceeds to the preprint processing function of block 52 and on to final printing with color printer 20 according to the function block of 54.

Figure 5:
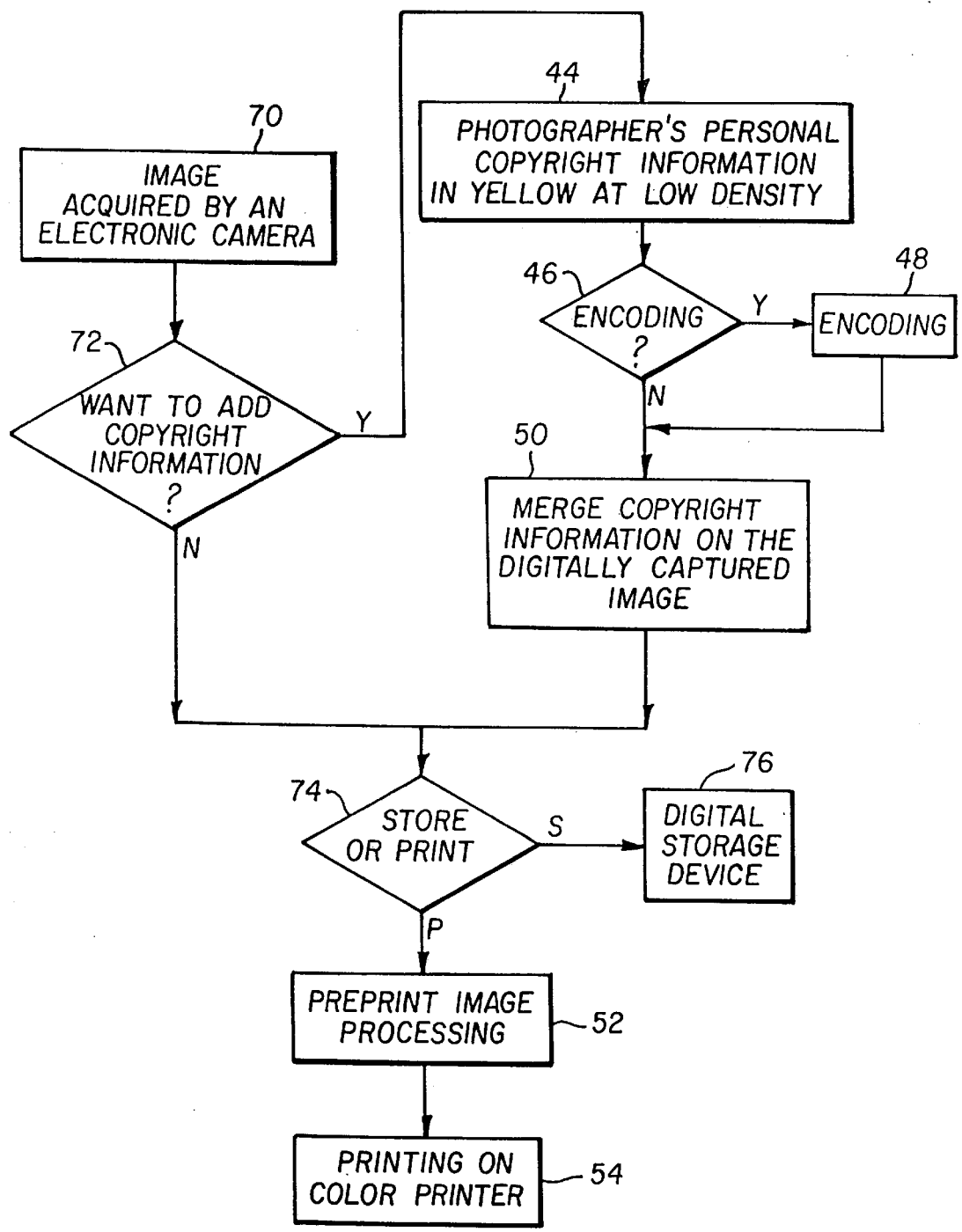
FIG. 5 is an algorithm for printing photographer's copy restrictive information in the image capture and print system.

Referring now to FIG. 5, in this embodiment of the invention an image (digital or analog) is acquired by the action of function block 70 using an electronic camera 22 located on site. After acquisition a decision is made as to whether copy restrictive information is to be recorded onto the acquired image by decision block 72. If the decision is "no" the electronic image is passed to a store or print decision block 74 and from there to either a storage device 76 or to a preprint processing by the function of block 52. Once the image is processed it may be selectively printed by the color printer 20 via the function block 54. If copy restrictive information is to be added to the acquired image, block 44 provides the copy restrictive information to a decision block 46 wherein encoding for the copy restrictive information may also be selected. If selected, the encoding function of block 48 is applied to the copy restrictive information and the merging of the encoded copy restrictive information with the acquired image information is performed in block 50. Once the selected information is merged it proceeds along the same process path as the non-copy protected image.

EXAMPLE

Figure 3:
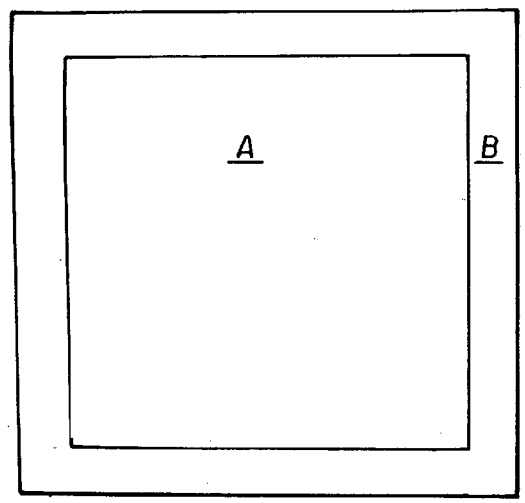
FIG. 3 is a depiction of the locations for the copyright information in a print. It can be inside the image (A) or on the margins (B)

A page-size thermal print on an 8.5"×11" receiver typically has white margins, surrounding the image. The thermal printer prints 8 bit density levels, per color, per pixel. The information about the printing event is printed in yellow on the margin such as: "Photostore name, City A; Sep. 20, 1995; Serial number 12345." along with any other relevant information. The yellow density of the text is chosen to be lower than 0.2. The text may be in plain language, as above, or encoded in cryptographic form. The text may also appear in different font sizes. The optimal font size may be chosen at spatial frequencies that are less sensitive to the human visual system. The color yellow is chosen because the human eye is least sensitive to the yellow color. On a white background, it is difficult for a viewer to notice the text. This is especially true when the text is printed on the margin of the photographic image which draws the attention of the eye. In a framed picture, the text is hidden behind the picture mask or the frame. The printing information can also be printed within the image areas of the print. The locations within a print are illustrated in FIG. 3.

Figure 6A:
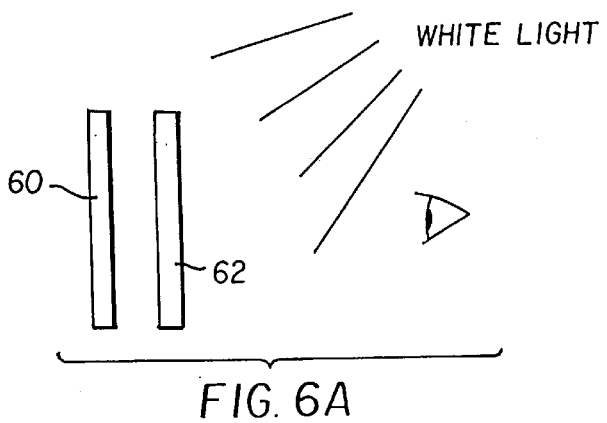
FIGS. 6A, 6B, and 6C depict detection methods: direct examination by eye under cyan illumination (6A, 6B); and decoding information by a scanner and a computer (6C).
Figure 6B:
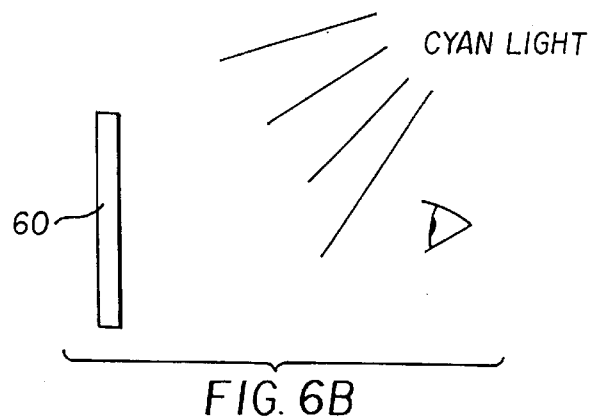
Figure 6C:
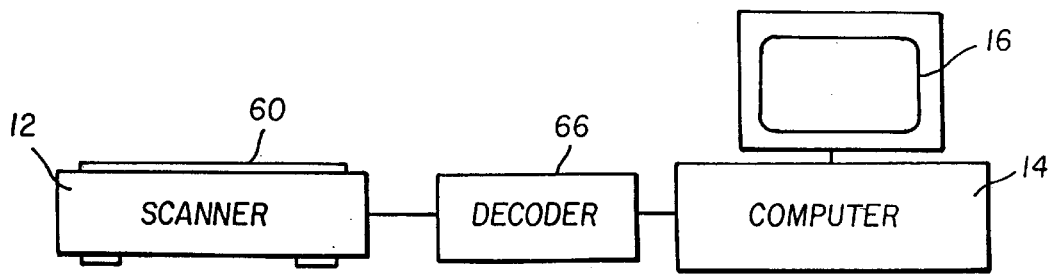

Referring now to FIG. 6A, light yellow text on a thermal print 60 can easily be visualized under cyan illumination by the human eye. This can be done by simply masking the text, on the thermal print, with a cyan filter 62 under a white illumination or as per 6B, by illuminating the thermal print 60 by a cyan light source. Since the common color for yellow and cyan is green, the text appears as a green color under the above viewing conditions. Since the human eye is most sensitive to green, the text becomes easily recognized. For an encoded image the system of FIG. 6C is used to scan the thermal print 60 in scanner 12 and by means of a decoder 66 an electronic image usable by the computer 14 is provided. Printing of the copy restrictive information on the print will then occur in the print operation. For the purpose of this disclosure, copy restrictive information may include, but is not limited to, the copyright symbol and associated words and dates, printing event information, image source data, the creator's name or code and the like.

These and other aspects, objects, features, and advantages of the present invention will be more clearly understood and appreciated from a review of the following detailed description of the preferred embodiments and appended claims, and by reference to the accompanying drawings.

PARTS LIST 10 color copy print system
12 scanner
14 computer
16 monitor
18 keyboard
20 color printer
22 electronic camera
40 function block
42 function block
44 function block
46 decision block
48 function block
50 function block
52 function block
54 function block
60 thermal print
62 cyan filter
66 decoder
70 function block
72 decision block
74 decision block
76 storage device

I claim:

1. A copy protection method for identifying copied images, comprising the steps of:

a) capturing the image in electronic form;

b) generating copy restrictive information in electronic form for printing as a plurality of contiguous pixels of substantially yellow color;

c) merging the electronic forms of the image and copy restrictive information from steps a) and b) to form a composite printable image;

d) printing the composite printable image using continuous-tone digital printing in which the copy restrictive information is printed as a plurality of contiguous pixels of yellow color density lower than 0.2 and at spatial frequencies not sensitive to the human visual system; and e) detecting the copy restrictive information on the printed image for identifying unauthorized copies.

2. The copy protection method according to claim 1 wherein the generated copy restrictive information is encoded.

3. The copy protection method according to claim 2 and further comprising the step of decoding the encoded copy restrictive information.

4. The copy protection method according to claim 1 wherein the detection of the copy restrictive information is performed by viewing the printed image with cyan containing illumination.

5. The method according to claim 1 wherein the copy restrictive information is printed in a border area that surrounds the printed image.

6. The copy protection method according to claim 1 wherein the generated copy restrictive information is at least a copyright symbol.

7. A copy protection system for protecting copy restrictive images, comprising:

means for capturing the image in electronic form;

means for generating copy restrictive information in electronic form for printing as a plurality of contiguous pixels of substantially yellow color;

means for merging the electronic forms to form a composite printable image;

means for printing the composite printable image using continuous-tone digital printing in which the copy restrictive information is printed as a plurality of contiguous pixels of yellow color density lower than 0.2 and at spatial frequencies not sensitive to the human visual system; and means for detecting the copy restrictive information on the printed image for identifying unauthorized copies.

8. The copy protection system according to claim 7 wherein said means for printing has at least 4 bit density range for each pixel.

9. The copy protection system according to claim 7 and further comprising, means for illuminating the printed image with cyan containing illumination.

10. The copy protection system according to claim 7 and further comprising, encoding means for encoding the copy restrictive information.

* * * * *